United States Patent

[11] 3,544,716

[72] Inventor Peter A. Franaszek
Middletown, New Jersey
[21] Appl. No. 741,181
[22] Filed June 28, 1968
[45] Patented Dec. 1, 1970
[73] Assignee Bell Telephone Laboratories, Incorporated
Murray Hill, New Jersey
a corporation of New York

[54] ADAPTIVE EQUALIZATION OF A DIGITAL COMMUNICATION SYSTEM
6 Claims, 2 Drawing Figs.

[52] U.S. Cl. .......... 178/69; 333/18
[51] Int. Cl. .......... H04b 3/14
[50] Field of Search .......... 178/69, 69(A), 70; 333/18

[56] References Cited
UNITED STATES PATENTS
3,292,110 12/1966 Becker et al. .......... 178/69

*Primary Examiner*—Kathleen H. Claffy
*Assistant Examiner*—Douglas W. Olms
*Attorneys*—R. J. Guenther and E. W. Adams, Jr.

ABSTRACT: In the disclosed system, logic circuitry selects a predetermined pulse combination in the received data signal. Error signals are derived from amplitude samples of the pulses in the selected pulse combination. These error signals are then collected to produce a control signal for the equalizer circuit. Because a specific pulse combination is selected, it is not necessary to perform a cross-correlation process or to determine the error at each level of the data signal.

INVENTOR
P. A. FRANASZEK
BY Leonard H. Arnold
ATTORNEY

ADAPTIVE EQUALIZATION OF A DIGITAL COMMUNICATION SYSTEM

BACKGROUND OF THE INVENTION

This invention relates generally to the equalization of digital signals in communication systems and, more particularly, to equalizer circuits which are able to adapt to changes in the distortion characteristics of the transmission medium.

Broadly speaking, the function of an equalizer in a digital communication system is to reshape the transmitted data pulses in order to avoid error in detecting the transmitted pulse code. The major source of error, known as intersymbol interference, is caused by the overlapping of distorted pulses in the transmission medium. In practical systems the distortion characteristics of the transmission medium change from time to time. The equalizer, accordingly, must be adjusted to account for these changes.

Initially, prior art equalizers were adjusted only during special testing periods, as described by R. W. Lucky, "Automatic Equalization for Digital Communication" 44 Bell System Technical Journal 547 (April 1965). That system contains a tapped delay line equalizer which is adjusted with specially transmitted test pulses prior to actual data transmission. A tapped delay line equalizer is a time domain network which generally contains a tapped delay line, an attenuator connected to each tap and a summing circuit for combining the attenuated outputs of each tap. In the system referred to above, each of the attenuators is adjusted with error signals derived from the test pulses so that the output of the equalizer conforms to the shape of the originally transmitted test pulse. The underlying theory is that once the line is properly equalized for the test pulses it is also equalized for the data signal. The obvious disadvantages are that the test pulses have to be transmitted separately from the data signals and that the equalizer has to be reset during special testing periods whenever the characteristics of the transmission line change.

Later a truly adaptive technique was developed, as described by R. W. Lucky "Techniques for Adaptive Equalization of Digital Communication Systems", 45 Bell System Technical Journal 255 (Feb. 1966) In that system, control signals which adjust a tapped delay line equalizer are continuously derived from the transmitted data signal. Essentially, the error in the received signal is determined by sampling the signal during each pulse period and comparing the samples to predetermining levels corresponding to the magnitudes of the pulses in the originally transmitted pulse code. The error in each sample is characterized as positive or negative, depending on whether it is above or below the closest of the predetermined levels. The polarity of the error for the sample of the present received pulse is then cross correlated with the polarity of the past, present and future received pulses to produce the control signals which adjust the equalizer. This cross-correlation process in effect determines the cause of the distortion in the equalized signal so that the attenuators in the taped delay line equalizer are properly adjusted.

SUMMARY OF THE INVENTION

Briefly, the control signals used to adjust the equalizer in the present invention are derived only from selected pulse combinations in the transmitted data signal. When specific pulse combinations are selected, the cause of the distortion remaining in the signal at the output of the equalizer is known and the circuitry required in comparison to previous equalization systems is simplified.

The basic principles of the invention may be simply explained by use of the following illustration: Assume that the transmitted signal is a three-level digital signal having a pulse code consisting of +1, 0 and −1 pulses and that an error signal is derived from the samples taken in the pulse periods of a particular pulse combination, such as +1, 0. The amplitude of the signal in any 0 pulse period is the error signal resulting essentially from the intersymbol interference of the preceding and succeeding +1 and −1 pulses. The intersymbol interference resulting from the succeeding +1 and −1 pulses will be averaged out over a long time period since the succeeding pulses will be randomly distributed among the +1 and −1 pulses: but the intersymbol interference from the preceding +1 and −1 pulses will not be averaged out since the +1 pulse was selected. Thus, the error resulting from the sampling of the digital signal during the chosen 0 pulse period results in the long run only from the preceding +1, pulse. Because the particular −1, 0 pulse combination is selected, the cause of the distortion is known and does not vary. Since the cause of the distortion is known, a cross-correlation process is not needed and the error samples may be collected and fed directly to the equalizer to perform the adjusting operation.

The selective technique used in the present invention has its own distinct advantages over the test pulse equalizer and the continuously adaptive equalizer described above. The advantage gained over the test pulse equalizer is that the present invention operates directly on the data signal without the need of special test periods; and the advantage gained over the continuously adaptive equalizer is that the circuitry operating on the signal samples can be simplified. Specifically, in the continuously adaptive equalizer the data signal must first be operated on to determine the polarity of the error for the sample of each present pulse. The polarity of this error must then be cross correlated with the polarity of the past, present and future pulses in the data signal to determine if the error resulted from the intersymbol interference of negative or positive pulses. In the present invention the cause of the distortion is known, so that a cross-correlation process is not needed. Furthermore, since a measure of the error need be obtained only at a selected pulse level, the error signal may be collected in an integrating circuit and fed directly to adjust the attenuators in a tapped delay equalizer.

DETAILED DESCRIPTION

Figure 1:
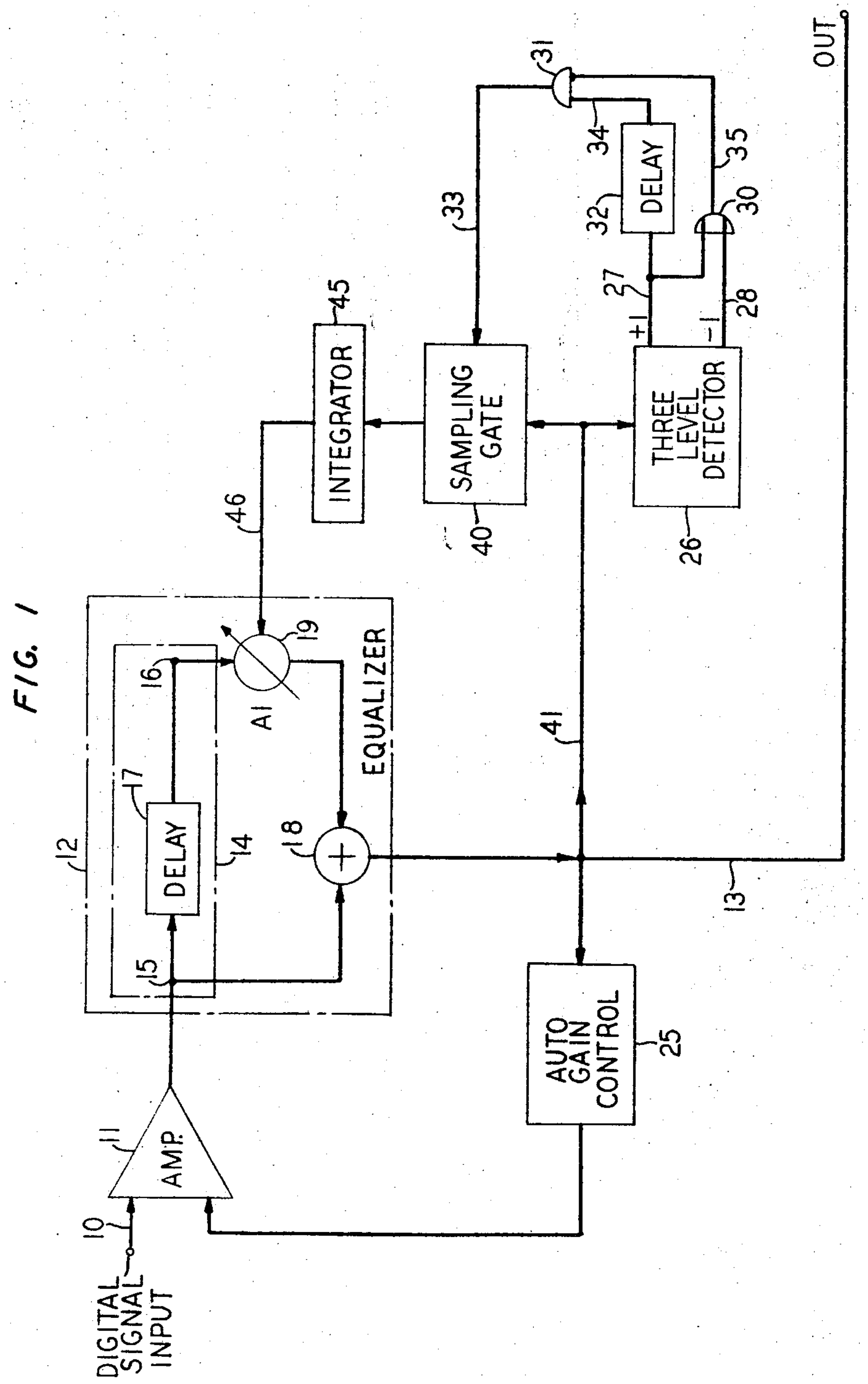
FIG. 1 is a block diagram of an adaptive equalizer embodying the principles of the invention.

An adaptive equalizer embodying the principles of the invention for a three-level digital signal is shown in FIG. 1. The three-level digital signal consisting of +1, −1, and 0 pulses from a distant transmitter is applied at input 10 passed through amplifier 11 to equalizer 12. As may be appreciated, the term "pulse" used in this specification is used broadly and symbolically to include the 0 pulse, which occurs in practice as a null in the transmitted signal.

The function of equalizer 12 is to reshape the distorted +1 and −1 pulses received at input 10 in order to minimize the distortion remaining in the signal at output 13. For the most part, the remainder of the circuitry shown in FIG. 1 produces the control signal which adjusts equalizer 12 in response to the distortion in the signal at output 13. As indicated above, the distortion characteristics of the transmission medium which carries the digital signal to input 10 generally changes from time to time and thereby necessitates the adjustment of equalizer 12.

Equalizer 12 is a tapped delay line equalizer well known in the prior art. Equalizer 12 is the simplest operative tapped delay line equalizer in that delay line 14 has only two taps 15 and 16 separated by delay element 17. A more complex tapped delay line equalizer having three taps is used in the embodiment shown in FIG. 2 described below, but for present purposes one with two taps is sufficient to illustrate the principles of the invention.

Delay element 17 has a time delay equal to one pulse period in the received data signal, so that the present received pulse appears at tap 15 when the immediately preceding received pulse appears at tap 16. The equalized signal at output 13 is produced from the sum of the pulses appearing at taps 15 and 16. The present pulse at tap 15 is applied unattenuated to summing circuit 18, while the preceding pulse at tap 16 is applied through attenuator 19, with attenuation factor $a_1$, to summing circuit 18.

To assure that the +1 and −1 pulses in the digital signal at output 13 have average amplitudes equal to their corresponding transmitted pulses, automatic gain control circuit 25 uses the average amplitude of the +1 pulses at output 13 as a reference and sends a signal to adjust amplifier 11. The operation on the amplitude and shape of the received pulses by automatic gain control 25 and equalizer circuit 12 completes the equalization of the signal at output 13.

Essentially, the theory underlying the tapped delay line equalizer shown in FIG. 1 is that attenuator 19 may be adjusted to add or subtract a portion of each preceding +1 or −1 pulse to or from each present +1 or −1 pulse so that the shape of each pulse at output 13 closely approximates the originally transmitted pulses. Generally, the use of only the preceding +1 or −1 pulse is most effective in practical systems when the major distortion in the received signal results from the spreading of the trailing edges of those pulses. In effect, the addition or subtraction of a portion of the preceding +1 or −1 pulse is used to offset the intersymbol interference caused by the trailing edge of each preceding +1 or −1 pulse.

In accordance with the embodiment of the present invention shown in FIG. 1, a control signal is derived from a selected +1, 0 pulse combination in the digital signal to adjust equalizer 12 and thereby minimize the distortion remaining in the signal at output 13. As indicated above, when only the +1, 0 pulse combination is examined, the error in the selected 0 pulse period is in the long run caused only by the preceding +1 pulse because the error from the succeeding +1 and −1 pulses is averaged out. If attenuator 19 in equalizer 12 is adjusted for the error caused by the selected +1 pulse, the equalizer is also adjusted for the remainder of the digital signal under the same principles which govern the test pulse equalizer described in the prior art above.

Briefly, in order to derive the control signal to adjust equalizer 12, three-level detector 26 separates the three types of pulses appearing at output 13. In response to detector circuit 26, logic circuitry consisting of OR gate 30, INHIBIT gate 31 and delay element 32 selects the +1, 0 pulse combination from the digital signal and triggers sampling gate 40 at the same time that the selected null signal, or 0 pulse, occurs in the digital signal at output 13. As indicated above, the amplitude of the sample in each selected 0 pulse period represents the error resulting from the intersymbol interference of the previous +1 pulse. A large number of these error samples from the 0 pulse periods are then added over a long time period in integrator circuit 45 to produce the control signal which is applied through lead 46 to attenuator 19. Since the control signal results only from the error caused by the selected +1 pulses, the control signal may be applied directly to attenuator 19 without the need of a cross-correlation process. If the addition of the error samples over a long time period, for example, results in a relatively higher positive control signal than at the previous time, the attenuation factor $a_1$ of attenuator 19 will be increased so that a smaller portion of the preceding pulses will be added to the present pulses to produce equalized output 13.

In more detail, three-level detector 26 contains three voltage ranges which are used to separate the three types of pulses appearing at output 13. Each pulse is characterized as a +1, 0 or −1 pulse, depending on whether its amplitude falls within a first, second, or third voltage range, respectively. Output 27 receives all of the +1 pulses and output 28 receives all of the −1 pulses and output 28 receives all of the +1 pulses arriving at the input of three-level detector 26. Delay element 32 is connected directly to +1 output 27 of detector 26, while OR gate 30 is connected to both +1 output 27 and −1 output 28 of detector 26.

Whenever a +1 pulse appears at output 27, it passes through delay element 32 with a delay of one pulse period to input 34 of INHIBIT gate 31. If a 0 appears in the pulse period following the +1 pulse, inhibit lead 35 of INHIBIT gate 31 will not be activated at the time that the +1 pulse appears at input 34. Under these conditions, INHIBIT gate 31 is enabled and a control pulse is passed to input 33 of sampling gate 40. The control pulse at input 33 triggers sampling gate 40 so that the digital signal appearing at output 13 is sampled through lead 41 at the same time that the selected 0 pulse period occurs. The signal is sampled in the 0 pulse period because the control pulse triggers the sampling gate only after the one pulse delay caused by delay element 32. If any pulse other than 0 follows the +1 pulse, sampling gate 40 will not be activated because the control pulse for input 33 will be inhibited by INHIBIT gate 31.

The samples taken in the selected 0 pulse period are added over a long time interval in integrator circuit 45 and applied directly to attenuator 19. The sum of the error samples over a long time period determines the value of attenuation factor $a_1$ by adjusting the setting on attenuator 19. Positive error samples indicate that a smaller portion of each preceding pulse should be added to each present pulse in equalizer 12; and as a result of the summation in integrator circuit 45, attenuation factor $a_1$ is increased in response to the positive error samples. Similarly, the converse is true when a preponderance of negative error samples are added in integrator circuit 45. It may be noted also that the above analysis applies whether the attenuation factor $a_1$ is positive or negative.

Figure 2:
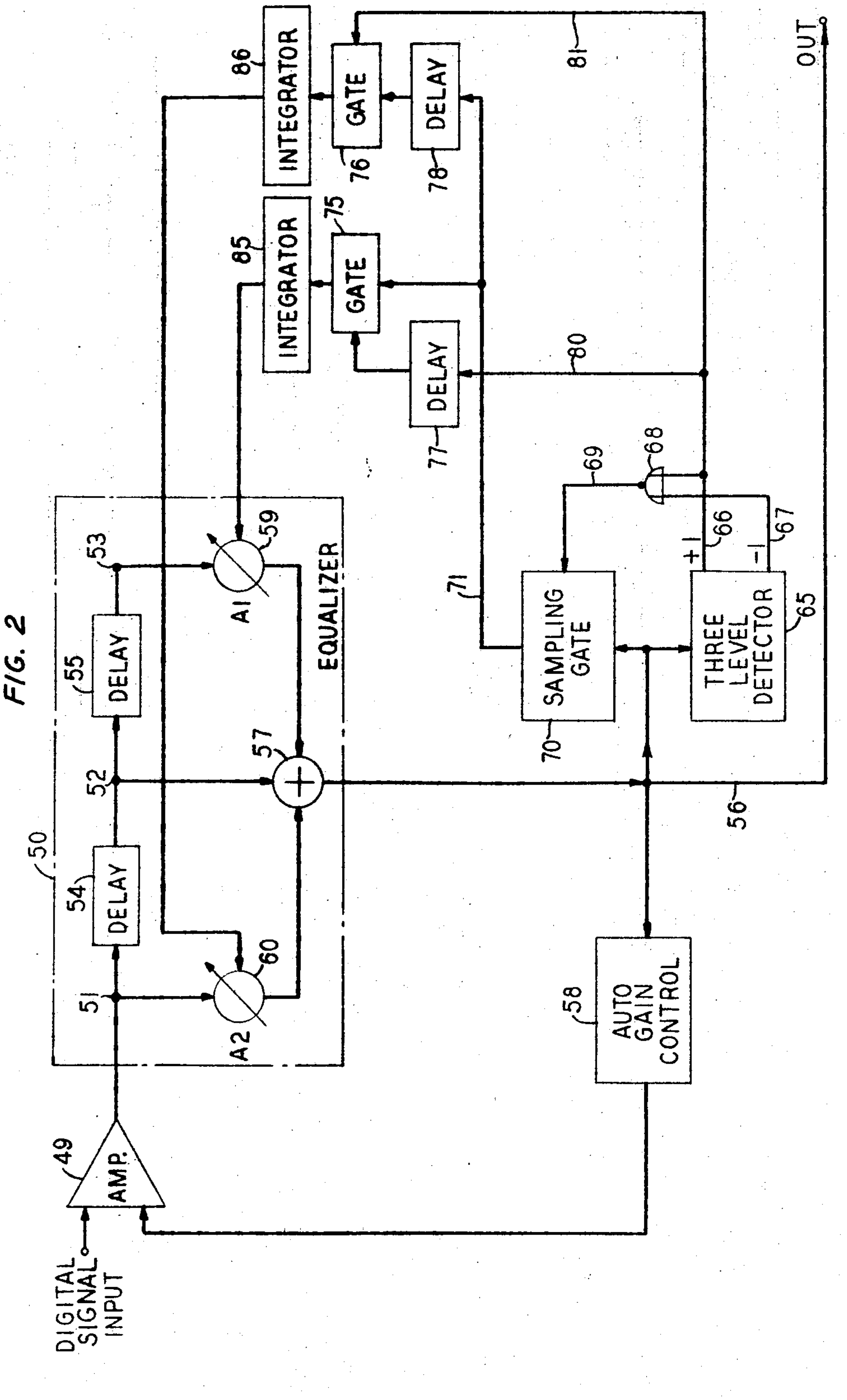
FIG. 2 is a block diagram of an alternative adaptive equalizer embodying the principles of the invention.

FIG. 2 shows an alternative embodiment of an adaptive equalizer illustrating the principles of the invention for a three-level digital signal. The technique used to adjust the adaptive equalizer shown in FIG. 2 is the same as the technique used to adjust the equalizer shown in FIG. 1. Equalizer 50 shown in FIG. 2, however, has three taps 51, 52, and 53 separated by two delay elements 54 and 55 instead of the two taps shown for equalizer 12 in FIG. 1. Under the same principles as described in FIG. 1, the function of equalizer 50 is to minimize the distortion in the pulses at output 56, but because three taps are used, the pulses at output 56 will more closely approximate the originally transmitted pulses.

The signal at output 56 results from the sum of the pulses appearing at taps 51, 52, and 53. As a time reference, the pulse at tap 52 is defined as the present received pulse, and the pulses at taps 51 and 53 are defined as the future and past pulses, respectively.

The theory underlying equalizer 50 is that the originally transmitted pulses may be approximated by adding portions of the past and future pulses to each present pulse. Specifically, a portion of the future pulse appearing through attenuator $a_2$ and a portion of the past pulse appearing through attenuator $a_1$ are added to the present pulse from tap 52 in summing circuit 57. The sum of these three pulses produces output 56. Again, the function of automatic gain control 58 is to adjust amplifier 49 so that the +1 pulses appearing at output 56 will have an average amplitude equal to the amplitude of the originally transmitted +1 pulses. The amplitude of the +1 pulses serves as a reference so that the average amplitude of the remainder of the digital signal also equals the amplitude of the originally transmitted signal.

In accordance with the embodiment of the invention shown in FIG. 2, attenuators 59 and 60 having attenuation factors $a_1$ and $a_2$ in equalizer 50 must be adjusted periodically so that the signal appearing at output 56 has a minimum amount of distortion. Attenuator 59 with attenuation factor $a_1$ shown in FIG. 2 may be adjusted by selecting a +1, 0 pulse combination from the digital signal in the same manner as described above with equalizer 12 in FIG. 1. In a similar manner, attenuator 60 with attenuation factor $a_2$ may be adjusted by selecting a 0, +1 pulse combination from the digital signal. That is, in the embodiment shown in FIG. 2 and described in detail below, logic circuitry selects both pulse combinations +1, 0 and 0, +1. The error signal in the 0 pulse period of the +1, 0 combination is used to adjust attenuator 59 and the error signal in the 0 pulse period of the 0, +1 pulse combination is used to adjust attenuator 60.

As indicated above, when a +1, 0 pulse combination is selected, the error resulting in the 0 pulse period is caused essentially by the intersymbol interference of the preceding, or past, +1 pulse. The error signals in the selected 0 pulse periods may be averaged over a long time interval and applied directly to adjust the attenuation factor $a_1$ in attenuator 59 so that the distortion caused by the preceding pulse is minimized. Similarly, when a 0, +1 combination is selected, the error appearing in the 0 pulse period results essentially from the succeeding, or future, +1 pulse. The error signals in those 0 pulse periods may be averaged over a long time interval and applied directly to to adjust the attenuation factor $a_2$ in attenuator 60 so that the intersymbol interference caused by the succeeding pulse is minimized.

The function of the remainder of the circuitry shown in FIG. 2 therefore is to select the +1, 0 and the 0, +1 pulse combinations and to apply the error signal appearing in the 0 pulse period for the +1, 0 combination to attenuator 59 and the error signal appearing in the 0 pulse period for the 0, +1 combination to attenuator 60.

Three-level detector 65, which separates the three types of pulses appearing at output 56, is identical to the three-level detector 26 shown in FIG. 1. A pulse appears at +1 output 66 when a +1 pulse appears at output 56; and a pulse appears at −1 output 67 when a −1 pulse appears at output 56. NOR gate 68 is inhibited whenever a pulse appears at either output 66 or 67 so that a control pulse appears in lead 69 only when a 0 occurs in the digital signal at output 56. Accordingly, sampling gate 70 is triggered by the control pulse in lead 69 whenever a 0 pulse appears at output 56.

Logic circuitry consisting of gates 75 and 76 and delay elements 77 and 78 functions to separate the samples of the 0 pulses from sampling gate 70 into those which occur in the +1, 0 combination and those which occur in the 0, +1 combination. Thus, for example, if a +1 pulse occurs prior to the 0 pulse, lead 80 connecting delay element 77 to +1 output 66 is activated. One pulse period later the +1 pulse appears at the output of delay element 77 and at the input of gate 75. This input from delay element 77 operates as a control input to pass the 0 sample appearing in lead 71 from sampling gate 70 through gate 70 through gate 75 to integrator circuit 85. Similarly, if a +1 pulse occurs after the 0 pulse, control lead 81 connected from the control input of gate 76 to +1 output 66 causes gate 76 to be enabled. The 0 sample from sampling gate 70 occurring one pulse period earlier passes through delay element 78 and appears at gate 76 at the time that the control lead for gate 76 is activated. Thus the 0 sample in the 0, +1 pulse combination is passed to integrator circuit 86.

Integrator circuits 85 and 86 add the error samples over a long time period to produce the control signals for attenuators 59 and 60, respectively. Each of the control signals from integrators 85 and 86 are applied directly to attenuators 59 and 60, respectively, in the same manner as described for the control signals in FIG. 1 above.

As may be appreciated from the discussion above, the essence of the present invention is the use of a selection technique in deriving the error signals which may be used to adjust an equalizer circuit.

The selective technique may be applied easily to more complex tap delay line equalizers than those shown in FIGS. 1 and 2. Assume, for example, that a tap delay line equalizer having five taps separated by four delay elements is used within the same general technique as equalizer 50 shown in FIG. 2. The two attenuators for the three middle taps could be adjusted in the same manner as described with respect to taps 51, 52 and 53 in FIG. 2. The two added taps with two added attenuators, one on the extreme left and one on the extreme right, would be adjusted from error signals derived from specially selected pulse combinations in the received digital signal. In accordance with the technique used for equalizer 50 in FIG. 2, the attenuator from the tap on the extreme right may be adjusted with a +1, _, 0 pulse combination and the tap on the extreme left may be adjusted with a 0, _, +1 combination. The blank space between the 0 pulse and the +1 pulse is filled by either a +1, −1, or 0 pulse and in the long run the effect of these pulses averages out. With the +1, _, 0 combination the error appearing in the 0 pulse period is caused by the previous +1 pulse which is two pulse positions removed in the past. This error signal is used to derive the control signal to adjust the attenuator in the left tap two positions from the center tap. Similarly, the error in the 0 pulse period of the 0, , +1 combination is caused primarily by the intersymbol interference from the +1 pulse which is two pulse positions in the future. This error signal is used to derive the control signal for the corresponding attenuator at the tap two pulse positions to the right of the center tap.

The selective technique of the present invention may also be applied to a variety of digital signals. If, for example, a tapped delay line equalizer is used to equalize a four-level digital signal consisting of +3, +1, −1, and −3 pulses, specific pulse combinations such as +3, +1, and +1, +3 could be selected to adjust the attenuators corresponding to attenuators 59 and 60 shown in FIG. 2. The control signal to adjust attenuation factor $a_1$ for attenuator 59 would be derived from the error in the +1 pulse period of the +3, +1 combination and the control signal to adjust attenuation factor $a_2$ would be derived from the error in the +1 pulse period of the +1, +3 combination. The error in the +1 pulse period is obtained by offsetting the amplitudes of the received +1 pulse with a voltage equal to the voltage of the originally transmitted +1 pulse. The difference between the amplitude of the originally transmitted +1 pulse and the amplitude of the sample detected in the +1 pulse period is the error caused essentially by the intersymbol interference of the preceding +3 pulse in the +3, +1 combination and by the succeeding +3 pulse in the +1, +3 combination. The error may be applied by methods similar to that described in FIG. 2 to adjust the attenuation factors $a_1$ and $a_2$.

Finally, it may be noted that the specific pulse combinations selected cure merely illustrative of the principles of the invention and do not represent the only possible combinations that might be selected. For example, for the three-level signal used in FIG. 1 the combination −1, 0 could be selected without sacrificing the accuracy of the error signal derived in the 0 pulse period. The only difference would be that the error would be caused by the preceding −1 pulse rather than the preceding +1 pulse. The equalizer circuit is easily adjusted to accommodate this polarity change.

In short, the critical factor is that once a specific pulse combination is selected, the cause of the error in a given pulse slot is isolated so that the control signal derived from the error signal in that pulse slot may be applied directly to an equalizer circuit to adjust some parameter and thereby reduce the error signal detected at its output. Thus, the selective technique described above may be applied to a variety of equalizer circuits, including both frequency domain and time domain circuits which may be adjusted by such a control signal.

Accordingly, it should be understood that the abovedescribed embodiment and samples are merely illustrative of the principles of the invention. Various modifications in adaptive equalizer circuits in accordance with the invention may be effected by persons skilled in the art without departing from the spirit and scope of the invention.

I claim:

1. Apparatus for adaptively equalizing a multilevel digital signal comprising in combination:
   - an adjustable equalizer circuit having input and output terminals, said digital signal being applied to said input terminal;
   - detection means for detecting each of the pulses in said multilevel digital signal at the output of said equalizer;
   - means responsive to said detection means for deriving error signals from said digital signal when a first predetermined pulse appears in said digital signal in a predetermined time relation to a second predetermined pulse;
   - means for collecting said derived error signals to produce a control signal; and means for applying said control signal to said equalizer to adjust the equalization of said multilevel digital signal.

2. Apparatus in accordance with claim 1 wherein said means for deriving error signals comprises a sampling gate and logic circuitry having a delay element, said logic circuitry being actuated when said first predetermined pulse appears in a predetermined time relation to said second predetermined pulse and said sampling gate being responsive to said logic circuitry to produce said error signals from said digital signal.

3. Apparatus for adaptively equalizing a multilevel digital signal comprising in combination:

a tapped delay line equalizer circuit having a plurality of adjustable tap attenuators for receiving said digital signal;

detection means for detecting the level of each pulse in said equalized digital signal from said equalizer circuit;

sampling means for producing amplitude samples of said digital signal;

means responsive to said detection means and said sampling means for deriving error signals from said samples when a first predetermined pulse appears in the signal at the output of said equalizer circuit in a predetermined time relation to a second predetermined pulse;

means for collecting said derived error signals; and means for applying said collected error signals to said plurality of attenuators in said equalizer circuit to adjust the equalization of said multilevel digital signal.

4. Apparatus for adaptively equalizing a multilevel digital signal comprising in combination:

an adjustable equalizer circuit adapted to receive said digital signal;

detection means responsive to said equalizer circuit for detecting the level of each pulse in the equalized digital signal from said equalizer circuit;

sampling means responsive to said equalizer circuit for sampling said multilevel digital signal when a first pulse having a first predetermined level appears in said digital signal;

means responsive to said detection means for deriving error signals from the samples produced by said sampling means when a second pulse having a second predetermined level appears in said digital signal in a predetermined time relation to said first pulse having said first predetermined level;

means for collecting said derived error signals; and means for applying said collected error signals to said equalizer circuit to adjust the equalization of said multilevel digital signal.

5. Apparatus in accordance with claim 4 wherein said adjustable equalizer circuit is a tapped delay line equalizer having a plurality of adjustable tap attenuators so that said collected error signals are applied to said attenuators to adjust the equalization of said digital signal.

6. Apparatus for adaptively equalizing a multilevel digital signal comprising in combination:

an amplifier circuit having adjustable gain control for receiving said multilevel digital signal;

a tapped delay line equalizer circuit having a plurality of adjustable tap attenuators for receiving said digital signal from said amplifier;

an automatic gain control circuit responsive to the equalized signal from said equalizer circuit for adjusting the gain on said amplifier circuit;

detection means for detecting the level of each pulse in said equalized digital signal from said equalizer circuit;

a sampling gate;

means responsive to said detection means for triggering said sampling gate when a first pulse having a first predetermined level appears in said equalized signal;

means for deriving a plurality of groups of error signals from said samples produced by said sampling gate, each of said groups being derived when a second predetermined pulse having a second predetermined level appears in said equalized signal in a different one of a plurality of predetermined time relations to said first predetermined pulse;

means for collecting each of said groups of error signals to produce a plurality of control signals; and means for applying each of said plurality of control signals to said plurality of attenuators in said equalizer circuit to adjust the equalization of said multilevel digital signal.